United States Patent [19]

Wulff et al.

[11] 4,186,227

[45] Jan. 29, 1980

[54] COATING SUBSTANCES

[75] Inventors: Helmut Wulff, Witten; Hans-Jürgen Hass, Troisdorf-Spich, both of Fed. Rep. of Germany

[73] Assignee: Dynamit Nobel Aktiengesellschaft, Troisdorf, Fed. Rep. of Germany

[21] Appl. No.: 745,715

[22] Filed: Nov. 29, 1976

[30] Foreign Application Priority Data

Dec. 3, 1975 [DE] Fed. Rep. of Germany ....... 2554220

[51] Int. Cl.$^2$ ............................................. B05D 3/02
[52] U.S. Cl. ................................ 427/388 A; 528/302; 525/441; 427/385 R
[58] Field of Search ....................... 427/385 R, 388 A; 260/75 R, 864, 850

[56] References Cited

U.S. PATENT DOCUMENTS

| 3,787,370 | 1/1974 | Shima | 260/75 R |
|---|---|---|---|
| 3,817,935 | 6/1974 | Beer | 260/75 R |
| 3,822,239 | 7/1974 | Chimura et al. | 260/75 R |
| 3,852,375 | 12/1974 | Biethan | 260/75 R |
| 4,065,439 | 12/1977 | Uno et al. | 260/75 R |

Primary Examiner—Ronald H. Smith
Assistant Examiner—Janyce A. Bell
Attorney, Agent, or Firm—Sprung, Felfe, Horn, Lynch & Kramer

[57] ABSTRACT

A linear polyester comprising residues of an acid component comprising 45 to 55 mole percent of a residue of terephthalic acid or its esterifieable derivatives; 35 to 45 mole percent of a residue of another aromatic dicarboxylic acid or esterifiable derivatives; 0 to 20 mole percent of a cycloaliphatic and/or aliphatic dicarboxylic acid; and residues of an alcohol component comprising 20 to 30 mole percent of a residue of hydroxypivalic acid neopentyl glycol ester; 20 to 30 mole percent of a residue of an aliphatic diol with a branched carbon atom; 40 to 60 mole percent of a residue of ethylene glycol of which up to 10 mole percent can be replaced by ether diols or by diprimary aliphatic diols of more than two carbon atoms in the chain; a coating composition containing moieties of terephthalic acid which is soluble without turbidity and soluble at room temperature further containing moieties of an aminoplastic resin, a coating composition comprising 10 to 25 weight percent aminoplastic resin and 75 to 90 weight percent of the above-named linear polyester; and the use of such coating composition in the coating of sheet metal substrates.

17 Claims, No Drawings

COATING SUBSTANCES

BACKGROUND OF THE INVENTION

1. Field of the Invention

This invention relates to a linear polyester. More especially, this invention relates to a coating composition comprising a specific linear polyester and an aminoplast resin. This invention is particularly concerned with coating compositions of linear polyesters containing moieties of terephthalic acid which are soluble without turbidity and are solid at room temperature which coating compositions further contain aminoplastic resins. The coating compositions of this invention can further contain pigments and conventional varnish adjuvants. Especially contemplated is a coating composition containing 10 to 25 weight percent of an aminoplastic resin and 90 to 75 weight percent of a linear polyester containing hydroxyl groups further characterized in that its acid component contains 45–55 mole percent of a residue of terephthalic acid or esterifiable derivative; 35 to 45 mole percent of a residue of another aromatic dicarboxylic acid or its esterifiable derivative and up to 20 mole percent of a cycloaliphatic and/or aliphatic dicarboxylic acid, the linear polyester residue further being characterized in that its alcohol component comprises 20 to 30 mole percent of a residue of hydroxypivalic acid neopentyl glycol ester, 20 to 30 mole percent of a residue of an aliphatic diol with a branched carbon chain and 40 to 60 mole percent of a residue of ethylene glycol (of which up to 10 percent can be replaced by ether diols or by diprimary aliphatic diols or more than two carbon atoms in the chain).

2. Discussion of the Prior Art

From German Auslegeschrift No. 1,805,182 it is known to use linear saturated polyester resins as binding agents for bake-on varnishes, wherein polyester resins containing hydroxyl groups and having average molecular weights between 600 and 3000, prepared from dicarboxylic acids such as phthalic acid or hexahydrophthalic acid, for example, and various diols, especially primary-secondary bivalent alcohols such as propanediol-1,2, are hardened with melamineformaldehyde resins by crosslinking.

The varnish films thus obtained, however, do not have the especially high elasticity combined with high surface hardness required in the coating of sheet metals (Comparative Experiments 1 and 2). According to the quality indexes of the European Coil Coating Association (ECCA), a test known as the T-bend test is used to determine the ability of the material to be bent 180° around mandrels of various diameters. The following formula is used:

$$T = \frac{\text{Smallest mandrel diameter}}{\text{Thickness of sheet metal}}$$

The smallest mandrel diameter is the diameter at which no cracks reaching all the way to the metal are found when the bend zone is examined with a ten-power magnifier. In Category 2, the minimum required value of T is 2.

As Comparative Experiments 1 and 2 will show, this requirement is not satisfied by lacquers of the Examples given in German Auslegeschrift No. 1,805,182. In addition, the polyesters described therein are highly viscous fluid substances at room temperature.

German Offenlegungsschrift No. 2,211,059 discloses the preparation of highly elastic coatings, in which the binding agents are polycondensation products of dimethyl terephthalate and diol mixtures with 5 to 50 mole-% of hydroxypivalic acid neopentyl glycol ester (HPN). Polyesters prepared in accordance with the Examples are solid substances at room temperature, but they do not dissolve clear in such commonly used solvents as, for example, a mixture of Solvesso 150 and ethyl glycol acetate in a ratio of 9 to 1 parts by weight (See Comparative Experiments 3 and 4), and in addition they acquire a dark yellow to brown discoloration.

Varnish films which contain these polycondensation products, in accordance with the Examples, as the sole binding agent, are not resistant to conventional lacquer solvents. In addition, as much as 35 weight-percent of solvent is needed to obtain a varnish with a viscosity between 100 and 120 seconds per DIN 53,211 that can be used in the coil coating process.

It is an object of this invention, therefore, to provide high quality coating substances of obtimum suitability for the coil coating process having a high solids content, in which the polyester resin on which they are based can readily be handled, is solid as room temperature and has a high solubility and a limited selection of special high boiling solvents suitable for the coil coating process.

It is another object of the this invention to provide polyester resins suitable for these coating substances which can be readily packed, shipped and processed in solid form e.g. in the form of lumps packed in bags.

It is a further object of this invention to provide a process for coating a sheet metal substrate with a cross-linkable coating composition.

SUMMARY OF THE INVENTION

Broadly this invention contemplates a linear polyester comprising a residue of acid component mixtures (A) comprising (A1:) 45 to 55 mole percent of a residue of terephthalic acid or its esterifiable derivatives; (A2:) 35 to 45 mole percent of a residue of another aromatic dicarboxylic acid or its esterifiable derivatives; (A3:) 0 to 20 mole percent of a cycloaliphatic and/or aliphatic dicarboxylic acid; and residues of alcohol component mixtures (B) comprising (B1:) 20 to 30 mole percent of a residue of hydroxypivalic acid neopentyl glycol ester; (B2:) 20 to 30 mole percent of a residue of an aliphatic diol with a branched carbon atom; (B3:) 40 to 60 mole percent of a residue of ethylene glycol of which up to 10 mole percent can be replaced by ether diols or by diprimaryaliphatic diols of more than two carbon atoms in the chain.

In a further feature of this invention there is contemplated a coating composition of linear polyester containing terephthalic acid moieties which are soluble without turbidity and solid at room temperature said coating composition comprising 10 to 25 weight percent of an aminoplastic resin and 75 to 90 weight percent of the linear polyester described supra containing hydroxyl groups.

A further feature of this invention contemplates an improvement in a process for coating a sheet metal substrate with a cross-linkable coating composition wherein said coating composition is applied to said substrate and cross-linked thereon, the improvement residue in employing as the coating composition a coating composition containing 10 to 20 weight percent of an aminoplastic resin and 75 to 90 weight percent of the linear polyester described supra containing hydroxyl groups.

The coating substances of the invention are used preferentially for the production of crosslinked coatings on sheet metal strips.

Suitable aromatic dicarboxylic acids which are used in mixture with terephthalic acid or preferably dimethyl esters thereof, are orthophthalic acid or its anhydride, or isophthalic acid or its dimethyl esters. Isophthalic acid is preferred.

Cycloaliphatic and aliphatic dicarboxylic acids, are, for example, tetrahydrophthalic acid, hexahydrophthalic acid, hexahydroisophthalic acid, hexahydroterephthalic acid, endomethylenetetrahydrophthalic acid, succinic acid, glutaric acid, alpha-methylglutaric acid, adipic acid, azelaic acid or sebacic acid. Wherein mention is made of esters, the alkyl esters are particularly contemplated, especially $C_1$–$C_4$ alkyl esters. Adipic acid is preferred.

Suitable aliphatic diols having branched carbon chains are those having up to 6 carbon atoms in a straight chain and having up to 3 alkyl substituents (methyl and/or ethyl), such as, for example, propanediol-1,2, butanediol-1,3, 2,2,4-trimethylenepentanediol-1,3, 2,2-dimethylpropanediol-1,3 (neopentyl glycol, NPG), 2,2,4- and 2,4,4-trimethylhexanediol-1,6. Neopentyl glycol is preferred.

Examples of unbranched diprimary diols having more than 2 and up to a maximum of 6 carbon atoms in the chain are propanediol-1,3, butanediol-1,4, pentanediol-1,5, hexanediol-1,6; Examples of ether diols are diethylene glycol and triethylene glycol.

The molar ratio of the components of the polyester resins to be used in the coating substances of the invention is critical. If mixture A contains more than 55 mole-%, and especially 100 mole-% of an A1 component, the polyester resin solutions quickly precipitate a more or less voluminous crystalline mass. If the isophthalic acid content (compound A2) is increased above 45 mole-%, the solubility of the polyester in high-boiling aliphatic solvents such as, for example, Solvesso 150, diminishes so greatly, even in the presence of ethyl glycol acetate, that two fluid phases quickly form from the initially uniform solution. This characteristic is not appreciably modified by increasing the content of neopentyl glycol (component B2) in mixture B to more than 30 mole-%.

A content of more than 20 mole-% of cycloaliphatic, and especially aliphatic, dicarboxylic acids (component A3), lowers the softening point of the polyester resin such that it becomes more difficult to handle it when it does not contain solvent. Furthermore, it decreases the hardness of the coatings. On the other hand, an increase in the B2 component, e.g. neopentyl glycol content, in mixture B beyond the T-bent test, while an increase in the neopentyl glycol ester content impairs especially the inherent color of the polyester resin.

Mixtures A and B are condensed to form the linear polyester resins of the coating substances of the invention by transesterification of the dicarboxylic acid dialkyl esters or by esterification of the dicarboxylic acids with the diols, in a known manner. In a preferred procedure, component A1, e.g. dimethylterephthalate is first transesterified at temperatures of 160° to 210° C. with the diols of mixture B at an A:B molar ratio of 1:1.2 to 1:1.5, in the presence of suitable catalysts such as, for example, tetrabutyl titanate and zinc acetate, and the methanol that is released in this process is removed by distillation through a packed column. In a second step, the remaining dicarboxylic acids of mixture A are polycondensed with the reaction product of the transesterification by heating at 210° to 220° C., with stirring and the use of a shielding gas such as nitrogen or carbon monoxide, for example, and with the continuous distillation of the water of condensation that is formed and the excess diols, it being desirable to evacuate the reaction vessel towards the end of the condensation.

The polyester resins thus obtained are brittle, nearly colorless products which are solid at 20° C., and whose solutions in common solvents results in no inhomogeneity and especially in no segregation of solid components, even over relatively long periods of time. The polyesters used in accordance with the invention have hydroxy numbers of 25 to 60, preferably 30 to 50, corresponding to average molecular weights of 1500 to 4000, determined in accordance with DIN 53240 (determination of end groups) acid numbers from 0 to 10, preferably 0 to 5, determined in accordance with DIN 53402 and softening points, measured in accordance with DIN 53,180, of 55° to 75° C.

The polyester resins of the present invention are readily soluble in the following solvents: aromatic hydrocarbons, i.e. toluene and/or xylene, ether glycols and/or their esters, i.e. ethyl glycol (cellosolve), ethyl glycol acetate (cellosolve acetate), chlorinated hydrocarbons, i.e. methylene chloride. These solvents can be used alone or as mixtures. With respect to said solvents at least about 60 g of resin per 100 cc of solvent disolved at 25° C. The solvent Solvesso 150 is believed to be a commercial petroleum destillate containing at least 97% of different higher alkylated $C_9$ to $C_{11}$ benzene hydrocarbons, i.e. methylethyl-, dimethylethyl-, tri- and tetramethyl-benzene.

Solvents especially suited to the coil coating process are, for example, distillates boiling between about 175° C. and 205° C. and having a high content of aromatic hydrocarbons, an example being solvesso 150, preferably in a mixture with high-boiling ether glycols or their esters, such as, for example, ethyl glycol, or ethyl glycol acetate, in a hydrocarbon-to-glycol ratio of 9:1 to 7 to 3, for example. The coatings which can be made therefrom in accordance with the invention contain, as an additional, essentially required component, commercial aminoplastic resins as crosslinking substances. These include urea-formaldehyde or melamine-formaldehyde condensation products, especially their ethers with $C_1$ to $C_4$ alcohols, such as those described in Ullmann Enzyklopädie der technischen Chemie, pp. 487 sqq., and 490 sqq., 3rd ed., 1953, for example, the disclosure of which is hereby incorporated herein by reference. Preferred are derivatives of triaminotriazine and of melamine, especially hexamethoxymethyl melamine.

The weight ratio of the polyester resin to the aminoplastic is between 75:25 and 90:10, preferably 80:20 to 85:15. In the case of poor compatibility, which manifests itself in defects in the surface of the varnish film, it may be desirable to heat the polyester resin and aminoplastic together in dissolved form at 60° to 80° C. for about 15 to 30 minutes, and/or to add substances promoting compatibility, such as butanol, for example.

To increase the speed of the reaction between the polyester resin and the aminoplastic, or to adjust it to the desired limits, it is usually necessary to add to the coating substances 0.3 to 0.5 wt.-% of suitable crosslinking catalysts, such as, for example, p-toluenesulfonic acid, either as free acid, as an ester, or as a salt, with respect to the total weight of the binding agent. The nature and amount of the catalyst will depend on the conditions in which the coating substance is to be used.

The coating substances of the invention are preferably applied dissolved in solvents. Fundamentally, however, solvent-free application from the melt is possible at temperatures at which no crosslinking reaction will occur, e.g. below 120° C.

The coating substances of the invention contain varnish adjuvants adapted to their particular application, such as, for example, dulling agents, leveling agents and the like, and also, and preferentially pigments, as well as fillers, if desired.

They can be hardened, especially under the conditions of the varnishing of sheet metal by the coil coating process, at object temperatures of 230° to 350° C., for a period of 60 to 40 seconds, to form highly elastic, hard and adherent, chemical-resistant and non-yellowing coatings.

In order to more fully illustrate the nature of the invention and the of practicing the same the following Examples are presented. The examples show the preparation of the polyester resins themselves as well as the use of such polyester resins to form coating compositions for sheet metal substrates. Also depicted are the formation of coatings on such sheet metal substrates. In all of the examples below, where reference is made to "parts", it is to be understood that they are parts by weight unless stated to the contrary.

EXAMPLES

Examples of the Preparation of the Polyester Resins

EXAMPLE 1

622 parts of dimethylterephthalate (DMT) were transesterified with 390 parts of hydroxypivalic acid neopentyl glycol ester (HPN), 199 parts by weight of neopentylglycol (NPG) and 246 parts of ethylene glycol (EG), in the presence of 0.37 parts of zinc acetate dihydrate and 0.37 parts of tetrabutyl titanate, by gradual heating to 210° C., with stirring, under a current of inert gas. The methanol that was released was removed by distillation through a packed column. After completion of the transesterification of the DMT, 426 parts of isophthalic acid (IPA) and 128 parts of sebacic acid (SEB) were added to the reaction product. The molar ratio of the starting substances is shown in Table 1.

Through condensation of the reaction mixture at a product temperature increasing gradually to 220° C., and removal of the reaction water and of excess diol by distillation, in a vacuum at the end, a virtually colorless linear polyester resin was obtained. This can be removed from the reaction vessel by means of a coolable metal band from which it can then be flaked off, or it can be dissolved in a suitable solvent such as Solvesso® 150 mixed with ethyl glycol acetate in a ratio of 8:2 parts by weight, such that a solution containing 60% solids will be obtained. Other examples are contained in Table 1 along with the characteristics of the products.

The polyester resins of Examples 1 to 5 can be incorporated into the coating substances of the invention, but the products of Examples 6 to 9, owing to their composition, cannot satisfy the established requirements.

Examples of the Preparation of the Coatings of the Invention 80 parts of a polyester of Examples 1 to 5, 20 parts of a hexamethoxymethylmelamine resin obtainable commercially under the name CYMEL 301®, and 100 parts of a suitable pigment such as titanium dioxide (rutile), for example, are made into an enamel by combining them in a known manner with sufficient solvent to achieve a pouring time between 100 and 120 seconds in accordance with DIN 53,211. As a solvent suitable for metal strip enameling, a mixture of 8 parts of a distillate boiling between about 175 and about 205° C. and having a high content of aromatic hydrocarbons such as Solvesso 150, for example, and 2 parts of ethyl glycol acetate. 0.3 to 0.5 weight-percent of p-toluenesulfonic acid in free, blocked or stabilized, commercial form, preferably as a ten to twenty-percent solution in, for example, benzyl alcohol, isopropanol or diacetone alcohol, is added to the coating substance for the purpose of catalyzing the crosslinking. It can also contain 0.2 to 0.7 wt.-% of common wetting agents and leveling agents, such as Byk P 104, Modaflow or Paint Additive 11, for example.

Aluminum plates coated with the coating substance are baked for 40 to 60 seconds at an oven temperature of 310° C., the object temperature amounting to about 230° C. The characteristics of the 18 to 20 microns thick coatings are given in Table 2.

From the polyester resin of Example 6 a coating is similarly obtained, which does not satisfy the requirements of the ECCA standard. The same applies to coatings made from binding agents of Comparative Experiments CE 1 and CE 2, while the products of Comparative Experiments CE 3 and CE 4, like those of Examples 7 and 8, did not dissolve without turbidity and therefore were not made into coatings.

Comparative Experiments

Pursuant to Examples 1 and 2 of German Auslegeschrift No. 1,805,182, two polyester resins were prepared whose starting substances and characteristics are contained in Table 3 under CE 1 and CE 2.

Polyester resins in accordance with Examples 1 and 2 of German Offenlegungsschrift No. 2,211,059, whose starting materials and characteristics are contained in Table 3 under CE 3 and CE 4, dissolved with turbidity in the 8:2 mixture of Solvesso 150 and ethylglycol acetate, and formed a sediment within a few days.

Table 1

| Example No. | 1 | | 2 | | 3 | | 4 | | 5 | |
|---|---|---|---|---|---|---|---|---|---|---|
| Raw Materials | Mol | Mol% | Mol | Mol% | Mol | Mol% | Mol | Mol% | Mol | Mol% |
| DMT | 1,0 | 50 | 1,0 | 50 | 1,1 | 55 | 0,9 | 45 | 1,0 | 50 |
| IPA | 0,8 | 40 | 0,8 | 40 | 0.7 | 35 | — | — | — | — |
| PAA | — | — | — | — | — | — | 0,8 | 40 | 0,7 | 35 |
| AD | — | — | 0,2 | 10 | 0,2 | 10 | 0,3 | 15 | — | — |
| SEB | 0,2 | 10 | — | — | — | — | — | — | — | — |
| HHPAA | — | — | — | — | — | — | — | — | 0,3 | 15 |
| HPN | 0,6 | 24,6 | 0,6 | 24,6 | 0,75 | 30 | 0,75 | 30 | 0,625 | 25 |
| NPG | 0,6 | 24,6 | 0,6 | 24,6 | 0,50 | 20 | 0,75 | 30 | 0,75 | 30 |
| EG | 1,24 | 50,8 | 1,04 | 42,6 | 1,25 | 50 | 1,0 | 40 | 1,125 | 45 |

Table 1-continued

| | | | | | | | | | | |
|---|---|---|---|---|---|---|---|---|---|---|
| DEG | — | — | 0,2 | 8,2 | — | — | — | — | — | — |
| Characteristics | | | | | | | | | | |
| AN | 2 | | 1 | | 0 | | 0 | | 0,5 | |
| OHN | 50 | | 32 | | 35 | | 33 | | 35 | |
| SP °C. | 64 | | 63 | | 69 | | 56 | | 69 | |
| Red. Visc. | 0,124 | | 0,175 | | 0,166 | | 0,188 | | 0,126 | |
| Solution+ | clear | | clear | | clear | | clear | | clear | |
| Viscosity+ | 2400 | | 4300 | | 2240 | | 2300 | | 2500 | |

| Example No. | 6 (Comparison) | | 7 (Comparison) | | 8 (Comparison) | | 9 (Comparison) | |
|---|---|---|---|---|---|---|---|---|
| Raw Materials | Mol | Mol% | Mol | Mol% | Mol | Mol% | Mol | Mol% |
| DMT | 0,6 | 30 | 1,0 | 50 | 1,0 | 100 | — | — |
| IPA | 1,2 | 60 | 0,8 | 40 | — | — | 1,8 | 90 |
| PAA | — | — | — | — | — | — | 0,2 | 10 |
| AD | 0,2 | 10 | — | — | — | — | — | — |
| SEB | — | — | 0,2 | 10 | — | — | — | — |
| HHPAA | — | — | — | — | — | — | — | — |
| HPN | 0,3 | 12,3 | 1,2 | 49,2 | 0,8 | 53,4 | 0,6 | 24,6 |
| NPG | 0,9 | 36,9 | — | — | — | — | 0,6 | 24,6 |
| EG | 1,24 | 50,8 | 1,24 | 50,8 | 0,7 | 46,6 | 1,24 | 50,8 |
| DEG | — | — | — | — | — | — | — | — |
| Characteristics | | | | | | | | |
| AN | 0,7 | | 1,4 | | 0,2 | | 1 | |
| OHN | 35 | | 51 | | 35 | | 36 | |
| SP °C. | 68 | | 46 | | 67 | | 63 | |
| Red. Visc. | 0,167 | | 0,159 | | 0,148 | | 0,158 | |
| Solution+ | clear | | clear product | | turbid precipitate | | turbid separation | |
| Viscosity+ | | | | | | | | |

Meaning of abbreviations:
DMT Dimethyl terephthalate
IPA Isophthalic acid
PAA Phthalic acid anhydride
AD adipic acid
SEB Sebacic acid
HHPAA Hexahydrophthalic acid anhydride
HPN Hydroxypivalic acid neopentyl glycol ester
NPG Neopentyl glycol
EG Ethylene glycol
DEG Diethylene glycol
AN Acid number per DIN 53,402 in mg KOH/g
OHN Hydroxy number per DIN 53,240 in mg KOH/g
SP °C. Softening point per DIN 53,180 in °C.

Red. visc. = Reduced viscosity $\eta_{red} = \left(\frac{\eta}{\eta_o} - 1\right) \cdot \frac{1}{c}$ $\eta$ = Viscosity of solvent (60 w.p. phenol + 40 w.p. 1,1,2,2-tetrachloroethane)
$\eta$ = Viscosity of solution
c = Concentration of solution 1 g/100 cm$^3$
+ = 60% solution in a mixture of Solvesso 150 and ethyl glycol acetate in a ratio of 8 : 2 parts by weight [m Pa.s]

Table 2

| Polyester resin from example No. | Content of solids computed (%) | Pouring time of varnish DIN 53211 (sec) | Bake-on conditions (°C./sec) | Gloss (Gardner) at 60° | T-bend+ test |
|---|---|---|---|---|---|
| 1 | 70 | 105 | 310/40 | 89 | 2 |
| 2 | 71 | 107 | 310/60 | 96 | 2 |
| 3 | 70 | 110 | 310/50 | 82 | 2 |
| 4 | 68 | 100 | 310/60 | 79 | 1 |
| 5 | 67,5 | 108 | 310/60 | 83 | 2 |
| 6 | 73,3 | 118 | 310/60 | 82 | 4 |
| V 1 | 78 | 36 | 310/60 | — | 4 |
| V 2 | 78 | 51 | 310/60 | — | 3 |

| Lead pencil+ hardness rating | Impression hardness DIN 53153 | Deep drawing ability DIN 53156 (mm) | Impact test ASTM D 2794-69 (inch-lbs.) |
|---|---|---|---|
| 3H | 111 | 7,4 | 80 |
| 2H | 100 | 6,5 | 80 |
| 2H | 91 | 6,5 | 80 |
| 2H | 91 | 6,5 | 80 |
| 2H | 105 | 6,5 | 80 |
| H | 125 | 6,5 | 70 |
| H | — | 6 | 80 |
| H | — | 6 | 70 |

+Test method of the ECCA (European Coil Coating Association)

Table 3

| | V 1 | | V 2 | | V 3 | | V 4 | |
|---|---|---|---|---|---|---|---|---|
| | Mol | Mol % | Mol | Mol % | Mol | Mol % | Mol | Mol % |
| DMT | — | — | — | — | 4,0 | 100 | 4,0 | 100 |
| PAA | 2,0 | 66,6 | 3,0 | 60 | — | — | — | — |
| AD | 1,0 | 33,3 | 2,0 | 40 | — | — | — | — |
| HPN | — | — | — | — | 1,43 | 19,2 | 1,0 | 11,4 |
| PD-1,2 | 2,0 | 50 | 3,0 | 50 | — | — | — | — |
| EG | 2,0 | 50 | 3,0 | 50 | 4,5 | 60,6 | 3,0 | 34,0 |
| HD-1,6 | — | — | — | — | 1,5 | 20,2 | 1,0 | 11,4 |
| NPG | — | — | — | — | — | — | 3,8 | 43,2 |
| AN | 2,3 | | 2,5 | | 1 | | 0,7 | |
| OHN | 1,10 | | 72 | | 20 | | 25 | |
| SP °C. | — | | — | | 71 | | 76 | |
| Red. Visc. | | | | | 0,243 | | 0,240 | |
| Viscosity | | | | | | | | |
| Solution+ | | | | | ++turbid | | ++turbid | |

Table 3-continued

|  | V 1 | | V 2 | | V 3 | | V 4 | |
| --- | --- | --- | --- | --- | --- | --- | --- | --- |
|  | Mol | Mol % | Mol | Mol % | Mol | Mol % | Mol | Mol % |
| [m Pa s] |  | 70 |  | 110 |  | precipitate |  | precipitate |

* 60% solution in xylene:n-butanol-ethylglycol-acetate 8:1:1 weight %.
** 50% solution in SOLVESSO 150:ethylglycolacetate = 9:1 weight %.
meaning of abbreviations (see also Table 1):
PD-1,2 = propanediol-1,2
HD-1,6 = hexanediol-1,6

What is claimed is:

1. A linear polyester comprising the polymeric condensation product of:
    A1. an acid component comprising 45 to 55 mole percent of terephthalic acid or its esterifiable derivatives;
    A2. 35 to 45 mole percent of another aromatic dicarboxylic acid or its esterifiable derivatives;
    A3. 0 to 20 mole percent of a cycloaliphatic and/or aliphatic dicarboxylic acid; and
    an alcohol component comprising
    B1. 20 to 30 mole percent of hydroxypivalic acid neopentyl glycol ester;
    B2. 20 to 30 mole percent of an aliphatic diol with a branched carbon atom;
    B3. 40 to 60 mole percent of ethylene glycol of which up to 10 mole percent can be replaced by ether diols or by diprimary aliphatic diols of more than two carbon atoms in the chain,
    said linear polyester having an average molecular weight of 1500 to 4000.

2. A linear polyester according to claim 1 wherein component B2 is an ester or anhydride of orthophthalic or isophthalic acid.

3. A linear polyester according to claim 1 wherein component A3 is tetrahydrophthalic acid, hexahydrophthalic acid, hexahydroisophthalic acid, hexahydroterephthalic acid, endomethylenetetrahydrophthalic acid, succinic acid, glutaric acid, alpha-methylglutaric acid, adipic acid, azeliac acid or sebacic acid.

4. A linear polyester according to claim 1 wherein component B2 is an aliphatic diol having up to 6 carbon atoms in a straight chain and having up to 3 alkyl substituents.

5. A linear polyester according to claim 4 wherein component B2 is propanediol-1,2, butanediol-1,3, 2,2,4-trimethylenepentanediol-1,3, 2,2-dimethylpropanediol-1,3 (neopentyl glycol, NPG), 2,2,4- or 2,4,4-trimethylhexanediol-1,6.

6. A coating composition which is soluble without turbidity and solid at room temperature containing moieties of terephthalic acid and an aminoplastic resin comprising:
    1. 10 to 25 Weight percent of an aminoplastic resin; and
    2. 75 to 90 weight percent of the linear polyester of claim 1.

7. A coating composition according to claim 6 wherein component B2 is an ester or anhydride or orthophthalic or isophthalic acid.

8. A coating composition according to claim 6 wherein component A3 is tetrahydrophthalic acid, hexahydrophthalic acid, hexahydroisophthalic acid, hexahydroterephthalic acid, endomethylenetetrahydrophthalic acid, succinic acid, glutaric acid, alpha-methylglutaric acid, adipic acid, azeliac acid or sebacic acid.

9. A coating composition according to claim 6 wherein component B2 is an aliphatic diol having up to 6 carbon atoms in a straight chain and having up to 3 alkyl substituents.

10. A coating composition according to claim 6 wherein component B2 is propanediol-1,2, butanediol-1,3, 2,2,4-trimethylenepentanediol-1,3, 2,2-dimethylpropanediol-1,3 (neopentyl glycol, NPG), 2,2,4- or 2,4,4-trimethylhexanediol-1,6.

11. In a process for coating a sheet metal substrate with a cross-linkable coating composition wherein said coating composition is applied to said substrate and cross-linked thereon, the improvement which comprises employing as the coating composition the composition of claim 6.

12. A linear polyester according to claim 1 having a hydroxyl number of 25 to 60, an acid number of 0 to 10 and a softening point of 55° to 75° C.

13. A linear polyester according to claim 1 having a hydroxyl number of 25 to 60.

14. A linear polyester according to claim 13 having a hydroxy number of 30 to 50.

15. A linear polyester according to claim 13 having an acid number of 0 to 10.

16. A linear polyester according to claim 15 having an acid number of 0 to 5.

17. A linear polyester according to claim 1 having a softening point of 55° to 75° C.

* * * * *